Aug. 6, 1935. J. F. EVERSOLE 2,010,427
DEHYDROGENATION OF METHANOL
Filed Jan. 14, 1933
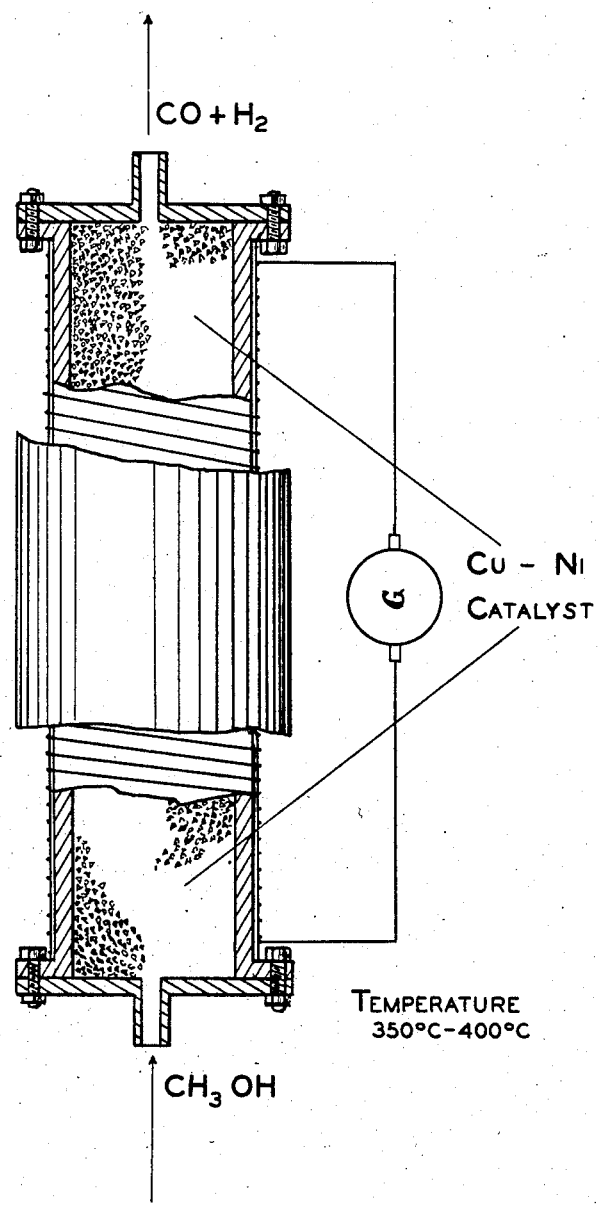

Registered Aug. 6, 1935

2,010,427

UNITED STATES PATENT OFFICE 2,010,427

DEHYDROGENATION OF METHANOL

James F. Eversole, Charleston, W. Va., assignor to Carbide and Carbon Chemicals Corporation, a corporation of New York Application January 14, 1933, Serial No. 651,853

9 Claims. (Cl. 23—233)

The invention is a process for dehydrogenating methanol to produce carbon monoxide and hydrogen, and includes a new catalyst for use in this process.

Gaseous mixtures of carbon monoxide and hydrogen which are pure are extremely difficult to prepare in an economical and commercially feasible manner. Such pure mixtures are valuable as reducing media and for the creation of artificial reducing atmospheres which are required in various chemical and physiological processes. The principal impurities to be avoided in making suitable mixtures of carbon monoxide and hydrogen for these applications are water and hydrocarbons or oxygenated organic compounds.

The principal object of my invention is to produce, by catalytic decomposition of methanol, a gaseous mixture of carbon monoxide and hydrogen which is as nearly as possible free from impurities. Another object is to provide a simple and economical process for making such mixtures from methanol. A further object is to provide a novel catalyst for use in the process.

The decomposition of methanol to carbon monoxide and hydrogen is a total dehydrogenation of the alcohol, and may be represented by the following equations:

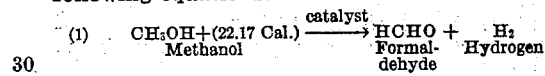

and

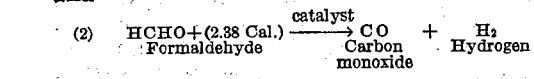

or

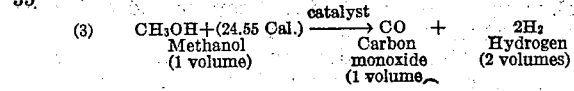

(In these equations heat requirements refer to kilogram calories.)

The true reaction is probably the summation of Equations (1) and (2) in series rather than a single reaction as in (3). This progress of the decomposition is indicated by the fact that the proper choice of conditions and catalysts will almost entirely avoid Equation (2), and induce a partial dehydrogenation of methanol to yield formaldehyde and hydrogen as substantially the sole products.

It is apparent that two lines of attack are presented in totally decomposing methanol to form carbon monoxide and hydrogen. Two catalysts may be employed in series to promote successively the reactions of Equations (1) and (2) respectively, or a single catalyst may be employed which will serve to induce both reactions. I prefer to employ this latter mode of procedure and employ but a single catalyst.

In the prior art, many catalysts have been proposed for decomposing methanol, and it has been almost universally accepted in the prior art that catalysts which were active in decomposing methanol were likewise useful for synthesizing methanol. Contrary to this generally accepted conclusion above stated, I have discovered a process for totally dehydrogenating methanol to produce practically pure gaseous mixtures of carbon monoxide and hydrogen which employs a catalyst that is utterly useless for and totally inactive in the reverse reaction, or in synthesis.

My new process is distinguished from the prior art in that the catalyst which I employ is exceedingly active in decomposing methanol to carbon monoxide and hydrogen, and produces these gases almost exclusively and free from impurities. No previously known process or catalyst has been successfully used to decompose methanol into carbon monoxide and hydrogen without also producing appreciable quantities of carbon dioxide and methane.

The accompanying drawing will, by the legends thereon, illustrate the nature of my invention, as applied to a conventional form of catalyst tube and associated apparatus.

My new catalyst contains reduced copper and nickel supported on an inert carrier. It may contain, for example, about 10% to about 30% of active constituents, that is copper and nickel, in the ratio of from about 2.5 to 1 to about 4 to 1 of copper to nickel. Within this range I prefer to use a catalyst containing about 20% of metals in the ratio of about 3 to 1 of copper to nickel. Suitable catalyst supports may be pumice, silica, asbestos and other relatively porous inert heat resistant materials. I prefer to employ "Filtros", a porous artificial silica filter stone. The support may be conveniently reduced to small sized pellets or chips and used in any desired physical shape and size. I prefer to use "Filtros" chips sized to pass an 8 mesh screen but be retained on a 10 mesh screen.

The method of preparing the catalyst will be illustrated by the following specific example:

Copper nitrate, $Cu(NO_3)_2 \cdot 3H_2O$, and nickel nitrate, $Ni(NO_3)_2 \cdot 6H_2O$, in the proportions of 37 parts by weight of the copper salt to 15 parts by weight of the nickel salt, were placed in a vessel and heated until both salts were dissolved in their water of hydration. To this concentrated hot solution were added 50 parts by weight of "Filtros"

chips sized to 10 x 8 mesh, and the whole was evaporated to dryness.

The dried impregnated support was then heated to eliminate nitrogen oxides and to convert the metals to their oxides. The catalyst in this state contained 15.5% copper and 4.8% nickel.

A charge of this catalyst was then placed in a copper tube and the oxides were reduced to the metals by passing a stream of methanol vapor over the heated catalyst. It was then ready for use.

The following data represents the typical operation of my process, and will serve to illustrate the invention.

| | |
|---|---:|
| Pressure—atmospheres | 1 |
| Temperature—°C | 400 |
| *Space velocity—liters/liter/hour | 125 |
| Methonal fed—grams | 75.6 |
| Liquid recovered—grams | 44.0 |
| Contained—grams | |
| Methanol | 43.8 |
| Water | 0.0 |
| Methyl formate | 0.0 |
| Formaldehyde | 0.2 |
| Gas recovered—liters | 66.0 |
| Contained—volume per cent | |
| Hydrogen | 68.5 |
| Carbon monoxide | 31.3 |
| Carbon dioxide | 0.0 |
| Ethylene | 0.0 |
| Methylal | 0.0 |
| Dimethyl ether | 0.0 |
| Methane | 0.2 |
| Methanol used—grams | 31.8 |
| Methanol ≡ $H_2$—grams | 32.3 |
| Methanol ≡ CO—grams | 29.4 |
| $H_2$ efficiency—per cent | 101.5 |
| $H_2$ overall yield—per cent | 42.7 |
| **Production ratio—grams/liter/hour | 9.59 |

* Space velocity refers to liters of methanol vapor, calculated to standard conditions, passing over one liter of catalyst in one hour.
** Production ratio refers to grams of hydrogen produced by one liter of catalyst in one hour.

From the foregoing data it will be seen that the catalyst of my invention effects nearly theoretical decomposition of methanol into carbon monoxide and hydrogen. The gas produced should in theory be composed of 66.7% $H_2$ and 33.3% CO, to which theoretical analysis may be compared the composition of the gas produced in my process composed of 68.5% $H_2$ and 31.3% CO with a trace of methane as its only detectable impurity.

As before stated, the catalyst which I employ is totally inactive in synthesis as opposed to the previously accepted rule that such catalysts will effect both synthesis and decomposition. Upon attempting to effect the synthesis of methanol over this catalyst in accordance with the best developed technique and under most favorable conditions, the carbon monoxide and hydrogen passed through unchanged. No liquid products of any kind were produced, nor were there any hydrogenated gaseous products.

The process may be varied, and greater space velocities may be employed. In general, space velocities of about 100 to 200 were suitable, and temperatures of about 350° to 400° C. may be employed. The process is preferably conducted at about atmospheric pressure.

I claim:

1. Process of making gaseous mixtures of carbon monoxide and hydrogen which comprises catalytically decomposing methanol by passing methanol vapors over a catalyst heated to a temperature between about 350° and 400° C., said catalyst consisting of reduced copper and nickel as essential active constituents.

2. Process of making gaseous mixtures of carbon monoxide and hydrogen which comprises catalytically decomposing methanol by passing methanol vapors over a catalyst heated to a temperature between about 350° and 400° C., said catalyst consisting of reduced copper and nickel supported on an inert carrier.

3. Process of making gaseous mixtures of carbon monoxide and hydrogen which comprises catalytically decomposing methanol by passing methanol vapors over a catalyst heated to a temperature between about 350° and 400° C., said catalyst consisting of reduced copper and nickel supported on an inert carrier, the ratio of copper to nickel being from about 2.5 to about 4 to 1.

4. Process of making gaseous mixtures of carbon monoxide and hydrogen which comprises catalytically decomposing methanol by passing methanol vapors over a catalyst heated to a temperature between about 350° and 400° C., said catalyst consisting of reduced copper and nickel in the ratio of about 3 to 1 supported upon porous silica stone.

5. Process of making gaseous mixtures of carbon monoxide and hydrogen substantially free from impurities which comprises passing methanol vapors at atmospheric pressure over a catalyst heated to about 400° C., said catalyst consisting of reduced copper and nickel supported upon porous silica stone, the total quantity of copper and nickel being about 20% by weight of said catalyst and the ratio of copper to nickel being about 3 to 1.

6. Process of making gaseous mixtures of carbon monoxide and hydrogen substantially free from impurities which comprises passing methanol vapors at atmospheric pressure over a catalyst heated to about 400° C., the velocity of said vapors being equal to about 125 liters of vapor per liter of catalyst per hour and said catalyst consisting of reduced copper and nickel supported upon porous silica stone, the total quantity of copper and nickel being about 20% by weight of said catalyst and the ratio of copper to nickel being about 3 to 1.

7. A catalyst for decomposing methanol to form carbon monoxide and hydrogen substantially free from impurities, and being totally inactive in hydrogenating carbon oxides to methanol, which consists of reduced copper and nickel supported upon an inert carrier.

8. A catalyst for decomposing methanol to form carbon monoxide and hydrogen substantially free from impurities, and being totally inactive in hydrogenating carbon oxides to methanol, which consists of reduced copper and nickel supported upon an inert carrier, the ratio of copper to nickel being from about 2.5 to about 4 to 1.

9. A catalyst for decomposing methanol to form carbon monoxide and hydrogen substantially free from impurities, and being totally inactive in hydrogenating carbon oxides to methanol, which consists of reduced copper and nickel in the ratio of about 3 to 1 supported upon porous silica stone, the total copper and nickel being about 20% by weight of the catalyst.

JAMES F. EVERSOLE.